3,822,355
NOVEL ORAL CONTRACEPTIVE METHOD
Fred A. Kincl, New York, N.Y., assignor to Biological
Concepts, Inc., New York, N.Y.
No Drawing. Filed Dec. 10, 1971, Ser. No. 206,920
Int. Cl. A61k 17/00
U.S. Cl. 424—243                 5 Claims

ABSTRACT OF THE DISCLOSURE

A method for the control of the ovulatory cycle comprises administering orally to a woman during a period of at least about 28 days in consecutive sequence, beginning on the first day of menstruation, a placebo dosage daily for a period of 16 days, then once daily following ovulation and for the next succeeding 4 days a progestational substance in a dosage effective to inhibit the function of the corpus luteum, and then for the remaining days of the cycle orally administering once daily a progestational substance in a dosage between about 10% and about 40% of the previous dosage for a given progestational substance. The dosage units may be contained in numbered detachable sealed pockets of a strip type dispenser.

BACKGROUND OF THE INVENTION

The present invention relates to a novel oral method for the control of ovulation, and to a sequence of dosage units and a dispensing system therefor.

The control or prevention of ovulation in women by means of orally administered contraceptive medication is now widely practiced. The basic principle involved is that of utilizing synthetic progestational and estrogenic substances to produce the same effects as the corresponding natural hormones. At a certain point in the reproductive process, the pituitary gland secretes follicle-stimulating hormones (FSH) and luteinizing hormones (LH). Following the release of the ovum by the rupture of the follicle, secretion of the estrogen estradiol, the follicle cell is transformed into the corpus luteum, with secretion of progesterone. Natural progesterone is believed to be involved in the process of endometrial growth. The natural estrogens and progesterone inhibt the secretion of FSH and LH during pregnancy and thus inhibit ovulation. The complete cycle takes place in about 28 days.

The known methods of ovulation control or prevention have usually involved the oral administration of combined progestational and estrogenic substances at some stage of the cycle. The earlier method, known as combined treatment, involved administering a combination of progestational and estrogenic substances usually on the 5th day after the beginning of the menstrual period, and prior to ovulation, for a period of about 21 days, followed by a cessation until the next cycle. An alternative method, the sequential treatment, only the estrogenic substance is administered for about 16 days, and then a combination dosage for about 5 to 6 days, followed by cessation until the resumption of the cycle.

The use of estrogens in ovulation control is widely regarded as questionable by the medical profession, because of side effects.

There have been attempts in the past to employ only progestational substances, without estrogens, to control fertility, in which the progestational agents were administered continuously throughout the cycle. This resulted in excessive bleeding and irregular menses and possibly some toxic effects due to continuous exposure.

GENERAL DESCRIPTION OF THE INVENTION

In accordance with the present invention there is provided a novel method of control or inhibition of fertility which avoids the disadvantages and undesired effects of previously known methods, and which eliminates the use of estrogens. It has been found, surprisingly and unexpectedly, that contraceptive protection can be achieved in women solely through the administration of progestational substances after ovulation. In accordance with this novel concept, there is orally administered to a woman, on the first day of the menstural cycle, i.e. when bleeding begins, a sequence of dosage units, continuing daily for a period of 16 days. This initial series of dosage units comprises an inactive or placebo substance. At the time this initial series is completed, ovulation will normally have begun. Ovulation is defined, for the purposes of the invention, as the monthly cyclical rupture of a ripe follicle which takes place usually between the 12th and 16th day after the beginning of menstruation. The day of ovulation is a term of art in this field. As explained in Johansson, Acta Endocrinological, 68, 779–792 (1971), it can be calculated from the urinary excretion of oestrogens and the plasma levels of progesterone. The first day of rapid decline after an ovulatory peak of urinary oestrogens and the second day with plasma levels of progesterone above 1 mg. is called the day of ovulation (cf. page 781). In an earlier article by Johansson and Wide, Acta Endocrinologica, 69, 82–88 (1969), the incidence of the day of ovulation is explained in terms of basal body temperature indication. Measurements of plasma LH and progesterone levels around the time of ovulation indicate that the lowest basal body temperature coincides with the first significant rise in LH levels. The relationship between the concentrations of LH and progesterone have great clinical significance, and a minimum in the BBT is found on the same day as the occurrence of the first significant increase in LH and progesterone. The empty follicle then fills up with blood clot and new cellular tissue is formed from the lining and is called the corpus luteum.

It has been found, in accordance with the invention, that the administration of one or more progestational substances during the period of formation of the corpus luteum, following ovulation, will provide contraceptive protection. By the use of the placebo sequence, the time of administration of the active progestational agent is postponed until after the onset of ovulation.

A great advantage of this mode of administration is that it reduces the over-all period of intake of the progestational agents to approximately one-half that of previously known methods. This is of great importance since thereby the accumulation of progestational substances in the body is minimized, and the incidence of adverse side-effects is correspondingly reduced. A further advantage is that the normal menstrual cycle is not disturbed. A still further important advantage is that the use of estrogenic agents is wholly eliminated. The patient or user is exposed to relatively few dosages, with attendant benefits.

Thus, in accordance with the invention, the administration of a progestational substance for 4 successive days, beginning 3 to 5 days after ovulation, in a strength sufficient to prevent the function of the corpus luteum is sufficient to prevent conception. However, experience has indicated that it may be desirable to continue the protestational agent medication for a period of an additional 7 days or so to prevent undesirable breakthrough bleeding. In such case the strength of the dosage units will be considerably lower, i.e. from about 10% to about 40% of the strength of the original application of the progestational agent. The latter are administered daily for the remainder of the cycle, generally 7 or 8 days. Thus, there is provided, in accordance with the invention, a high progestational dosage sequence of 4 days, and a low progestational sequence of about 7 days.

There may be employed, in accordance with the invention, any suitable progestational substance which exhibits activity inhibiting the function of the corpus luteum. Examples of progestational substances of this type include: norethindrone, norgestrel, norethindrone acetate, norethynodrel, medroxyprogesterone acetate, dimethisterone, ethylnodiol diacetate, and chlormadinone acetate, or mixtures of these agents. In general, the progestational agent will be the same for both the high and low dosage units, but this may be varied according to circumstances.

Typical high dosage ranges are: 5 to 10 mg. for norethindrone, 10 to 20 mg. for norethynodrel, 2 to 5 mg. for norgestrel, and 7 to 15 mg. for chlormadinone acetate.

Corresponding low range dosage are: 1 to 3 mg. for norethindrone, 0.5 to 1 mg. for norgestrel, 3 to 5 mg. for norethynodrel, and 1 to 2 mg. for chlormadinone acetate.

Advantageously, the individual dosage units are packaged in a suitable type of dispenser which contains the entire sequence. Preferably the dispenser package is of the type conventionally employed in pharmaceutical work, wherein the dosage unit is enclosed in a laminated strip or foil, which may be transparent. Thus, plurality of sealed detachable pockets in the form of a strip is provided, each marked with a numeral, and each detachable along a tear line. The material of the package may be a plastic film such as polyvinyl chloride or polyethylene, capable of being heat sealed, or it may be a laminate of metal foil, such as aluminum foil-plastic laminate, heat sealed or bonded with adhesive along the outer edges and between adjacent pockets.

The placebo or inactive dosage units may be composed of any pharmaceutically acceptable ingredient conventionally employed for this purpose, such as lactose, glucose, sucrose, corn starch, potato starch, or kaolin. Vitamins or iron compounds may be included, if desired.

DESCRIPTION OF THE PREFERRED EMBODIMENTS

The following examples, which are not to be regarded as limiting, serve to illustrate the practice of the invention:

Example 1

A sequence of 28 tablets is prepared, the three portions of which are as follows:

16 tablets each containing 100 mg. placebo dosages of 50% lactose and 50% potato starch, 1% of a binder (polyvinylpyrrolidone) and 3% of a lubricant (magnesium stearate), by weight.

4 high dosage tablets each containing 5 mg. of norethindrone plus 7 mg. potato starch binder.

7 low dosage tablets each containing 1 mg. norethindrone plus 8 mg. potato starch binder.

1 extra tablet of placebo as above.

These tablets are arranged sequentially and sealed between a pair of transparent plastic film strips, and heat sealed so as to form 28 pockets with a crimped tear line applied between adjacent pockets to provide ready detachment.

Example 2

A sequence of 28 tablets is prepared, the three portions of which are as follows:

16 tablets each containing 70 mg. placebo dosage of 69% lactose, 47% potato starch, 1% polyvinyl pyrrolidone, and 3% of magnesium stearate, by weight.

4 high dosage tablets each containing 8 mg. of norethindrone acetate in the same tablet formation as given for the placebo tablet.

7 low dosage tablets each containing 2.5 mg. of norethindrone acetate plus 0.05 mg. of ethynylestradiol in the same tablet formation as given for the placebo tablet.

Example 3

A sequence of tablets was prepared as given in Example 2, except that the 4 high dosage tablets each contained 6 mg. of norethindrone, and the 7 low dosage tablets each contained 0.4 mg. of norethindrone and 0.035 mg. of ethynylestradiol.

Example 4

A sequence of tablets was prepared as described in Example 2 except that the 4 high dosage tablets each contained 2 mg. of norgestrel and the 7 low dosage tablets each contained 0.1 mg. norgestrel.

What is claimed is:

1. Method for the control of the ovulatory cycle in women during a period of at least about 28 days without disturbing the normal menstrual cycle and without the side effects of the use of estrogens in ovulation control, and without the excessive bleeding, irregular menses and other possible toxic effects due to continuous exposure to progestational agents, administered continuously throughout the cycle, by a consecutive sequence comprised of part-cycle dosage units without estrogens, administering orally to a woman, beginning on the first day of menstruation, once daily, an inactive or placebo dosage on successive days until the 12th to 16th day after the beginning of menstruation, when ovulation as defined by the monthly cyclical rupture of a ripe follicle has usually begun, then administering orally for the next 4 days once daily a dosage of from about 2 to about 20 mg. of a progestational substance effective to inhibit the function of the corpus luteum, and then for the remaining days of the cycle, orally administering once daily at least one progestational substance in a dosage between about 10% and about 40% by weight of the previous dosage, contraceptive protection being provided during the period of formation of the corpus luteum, following ovulation, the administration of a high progestational sequence for 4 successive days, beginning 3 to 5 days after ovulation, in a strength sufficient to prevent the function of the corpus luteum, being sufficient to prevent conception; while the following low progestational sequence of about 7 days for the remainder of the cycle, prevents undesirable breakthrough bleeding.

2. The method of Claim 1 in which the period of administration of the placebo is about 16 days.

3. The method of Claim 1 in which the same progestational substance is administered in both the higher and lower dosages.

4. The method of Claim 1 in which the progestational substance is norethindrone.

5. The method of Claim 1 in which said dosage units are distributed sequentially in the stated order by enclosing each unit within a detachable pocket formed by adhering a pair of transparent plastic strips at the edges and between adjacent dosage units.

References Cited

Johansson et al.: Acta Endocrinological, 62:82–88 (1969), "Periovulatory Levels of Plasma Progestrone and Luteinizing Hormone in Women."

Johansson: Acta Endocrinologica, 68:779–792, December 1971, "Depression of the Progesterone Levels in Women Treated With Synthetic Gestagens After Ovulation" (a preliminary report was given in Hamburg, September 1970, 3rd Int. Cong. on Steroid Hormones) (rec'd Apr. 29, 1971).

Foss: J. Reprod. Fert., Suppl. 5:145–154 (1968), Oral Contraception With Continuous Microdosage of Norgestrel.

Roland: J. Reprod. Fert., Suppl. 5:173–177 (1968), Norgestrel-Induced Cervical Barrier to Sperm Migration.

Cox: J. Reprod. Fert., Suppl. 5:167–172 (1968), "The Pre-Coital Use of Mimi Dosage Progestogens."

Rudel: Federation Proceedings, 29:1228–1231, May-June 1971, Antifertility Effects of Low Dose Progestin.

(Other references on following page)

References Cited

Rudel: Fertility & Sterility, 18:219–222 (1967), Hormonal Fertility Control: A working hypothesis for population control.

Rudel: Fertility & Sterility, 16:158–169 (1965), the role of progestogens in the hormonal control of fertility.

Martinel-Manautu et al.: Fertility & Sterility, 18:57–62 (1967), continuous progestogen contraception: A dose relationship study with chlormadinone acetate.

Martinel-Manautou et al.: Fertility & Sterility, 17:49–57 (1966), low Doses of Progestogen as on Approach to Fertility Control.

SHEP K. ROSE, Primary Examiner

U.S. Cl. X.R.

424—239